(12) United States Patent
Sanchez

(10) Patent No.: US 8,111,013 B2
(45) Date of Patent: Feb. 7, 2012

(54) METHOD AND FIRMWARE FOR CONTROLLING VOLTAGE AND CURRENT IN A FLUORESCENT LAMP ARRAY

(75) Inventor: Jorge Sanchez, Poway, CA (US)

(73) Assignee: Tecey Software Development KG, LLC, Dover, DE (US)

( * ) Notice: Subject to any disclaimer, the term of this patent is extended or adjusted under 35 U.S.C. 154(b) by 877 days.

(21) Appl. No.: 12/043,070

(22) Filed: Mar. 5, 2008

(65) Prior Publication Data
US 2008/0315793 A1 Dec. 25, 2008

Related U.S. Application Data

(60) Provisional application No. 60/893,016, filed on Mar. 5, 2007.

(51) Int. Cl.
*H05B 37/02* (2006.01)

(52) U.S. Cl. .................. 315/307; 315/276; 315/312

(58) Field of Classification Search .......... 315/224–225, 315/274–276, 282–283, 291, 294, 297, 307–309, 315/312, 360
See application file for complete search history.

(56) References Cited

U.S. PATENT DOCUMENTS

| | | | |
|---|---|---|---|
| 6,424,100 B1 * | 7/2002 | Kominami et al. | 315/307 |
| 6,922,023 B2 * | 7/2005 | Hsu et al. | 315/291 |
| 7,211,966 B2 * | 5/2007 | Green et al. | 315/224 |
| 7,525,255 B2 * | 4/2009 | Jin | 315/174 |
| 2002/0097008 A1 | 7/2002 | Krummel | |
| 2002/0167302 A1 * | 11/2002 | Gallavan | 324/117 R |
| 2003/0001516 A1 * | 1/2003 | Newman et al. | 315/224 |
| 2003/0001524 A1 * | 1/2003 | Lin et al. | 315/312 |
| 2004/0051473 A1 * | 3/2004 | Jales et al. | 315/276 |
| 2005/0012470 A1 | 1/2005 | Qiu | |
| 2005/0116662 A1 | 6/2005 | Sanchez | |
| 2005/0122061 A1 | 6/2005 | Chen | |
| 2005/0146290 A1 * | 7/2005 | Gray | 315/307 |
| 2006/0132061 A1 | 6/2006 | McCormick et al. | |
| 2007/0090774 A1 * | 4/2007 | Ger et al. | 315/291 |
| 2008/0136343 A1 * | 6/2008 | Yu et al. | 315/219 |

OTHER PUBLICATIONS

International Search Report from PCT/US2008/055973 dated Jun. 1, 2009 (2 pages).

(Continued)

*Primary Examiner* — Tung X Le

(74) *Attorney, Agent, or Firm* — Schwabe, Williamson & Wyatt, P.C.

(57) ABSTRACT

A method and firmware for controlling voltage and current in an electrical load includes steps of calculating a numerically quantized duty cycle of a pulse-width modulated, digital switch control signal by firmware in an inverter voltage microcontroller as a function of an inverter voltage and controlling the inverter voltage by adjusting the duty cycle of the digital switch control signal to generate a load current in the electrical load.

22 Claims, 15 Drawing Sheets

OTHER PUBLICATIONS

Written Opinion for PCT/US2008/055973 mailed Jun. 1, 2009.
International Preliminary Report on Patentability for PCT/US2008/055973 mailed Sep. 8, 2009.
Supplementary European Search Report for EP 08 73 1485 mailed Dec. 21, 2010.
CEYX Technologies, Inc.: "CEYX LCD Backlighting Control", 2005, pp. 1-4, XP002613186, retrieved from the Internet: URL:http://www.ceyx.com/productdocs/CEYX%20LCD%20Backlighting%20Control%20WP.pdf [retrieved on Dec. 3, 2010].
CEYX Technologies, Inc.: "Power Consumption Reductions in CCFL Backlight System", 2005, pp. 1-6, XP002613187, retrieved from the Internet: URL:http://www.ceyx.com/productdocs/CEYX%20Power%20Savings%20WP.pdf [retrieved on Dec. 7, 2010].
Office Action for Korean Application No. 10-2009-7020810, mailed May 16, 2011.

* cited by examiner

US 8,111,013 B2

METHOD AND FIRMWARE FOR CONTROLLING VOLTAGE AND CURRENT IN A FLUORESCENT LAMP ARRAY

CROSS-REFERENCES TO RELATED APPLICATIONS

This application claims the benefit of U.S. Provisional Application No. 60/893,016 filed on Mar. 5, 2007, entitled METHOD AND FIRMWARE FOR CONTROLLING VOLTAGE AND CURRENT IN A FLUORESCENT LAMP ARRAY, which is hereby expressly incorporated by reference in its entirety for all purposes.

FIELD OF THE INVENTION

The present invention is directed to controlling arrays of fluorescent lamps. More specifically, but without limitation thereto, the present invention is directed to a method and firmware for controlling voltage and current in a fluorescent lamp array.

DESCRIPTION OF RELATED ART

Fluorescent lamp arrays are typically incorporated into backlights for liquid crystal displays (LCD), for example, in computers and television receivers. The voltage and current of the fluorescent lamps are regulated to strike, or ionize, the fluorescent lamps and to maintain a desired light output from the fluorescent lamp array. Several devices have been employed in the prior art to regulate voltage and current in a fluorescent lamp array.

SUMMARY OF THE INVENTION

In one embodiment, a method of controlling voltage and current in an electrical load includes steps of:
calculating a numerically quantized duty cycle of a pulse-width modulated, digital switch control signal by firmware in an inverter voltage microcontroller as a function of an inverter voltage; and
controlling the inverter voltage by adjusting the duty cycle of the digital switch control signal to generate a load current in the electrical load.

In another embodiment, a method of controlling voltage and current in an electrical load includes steps of:
calculating a numerically quantized duty cycle of a pulse-width modulated, digital switch control signal by firmware in a load current microcontroller as a function of a load current in the electrical load; and
controlling the load current by adjusting the duty cycle of the digital switch control signal when an inverter voltage is applied to the electrical load.

BRIEF DESCRIPTION OF THE DRAWINGS

The above and other aspects, features and advantages will become more apparent from the description in conjunction with the following drawings presented by way of example and not limitation, wherein like references indicate similar elements throughout the several views of the drawings, and wherein.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that may be useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific order to be performed. However, practitioners of the art will understand that the specific order is only given by way of example and that the specific order does not exclude performing the described steps in another order to achieve substantially the same result. Also, the terms and expressions used in the description have the ordinary meanings accorded to such terms and expressions in the corresponding respective areas of inquiry and study except where other meanings have been specifically set forth herein. The term "firmware" is used interchangeably with and means the same as the phrase "a computer readable storage medium tangibly embodying instructions that when executed by a computer implement a method".

Previously, discrete analog components have been used in circuits such as RC oscillators to generate the timing frequencies and voltage levels used to control fluorescent lamp arrays. However, as the performance requirements for fluorescent lamp arrays become more stringent with regard to maintaining a light output within a narrow tolerance for each fluorescent lamp, the instability of analog component behavior due to varying operating temperature, manufacturing variations, and aging becomes a problem. Also, the smaller size and reduced cost requirements of fluorescent lamp array controllers render the use of discrete analog components increasingly impractical. A preferred alternative is to embody the functions performed by analog controllers into firmware implemented on a microcomputer to avoid the use of analog components as much as possible if not altogether and to minimize the total number of components in the fluorescent lamp array controller. Reducing the number of components advantageously reduces the cost of manufacturing and the size of the fluorescent lamp array controller. The term "microcontroller" is descriptive of the compact dimensions of the fluorescent lamp array controller achieved by using firmware and integrated circuits to replace analog components.

Figure 1:
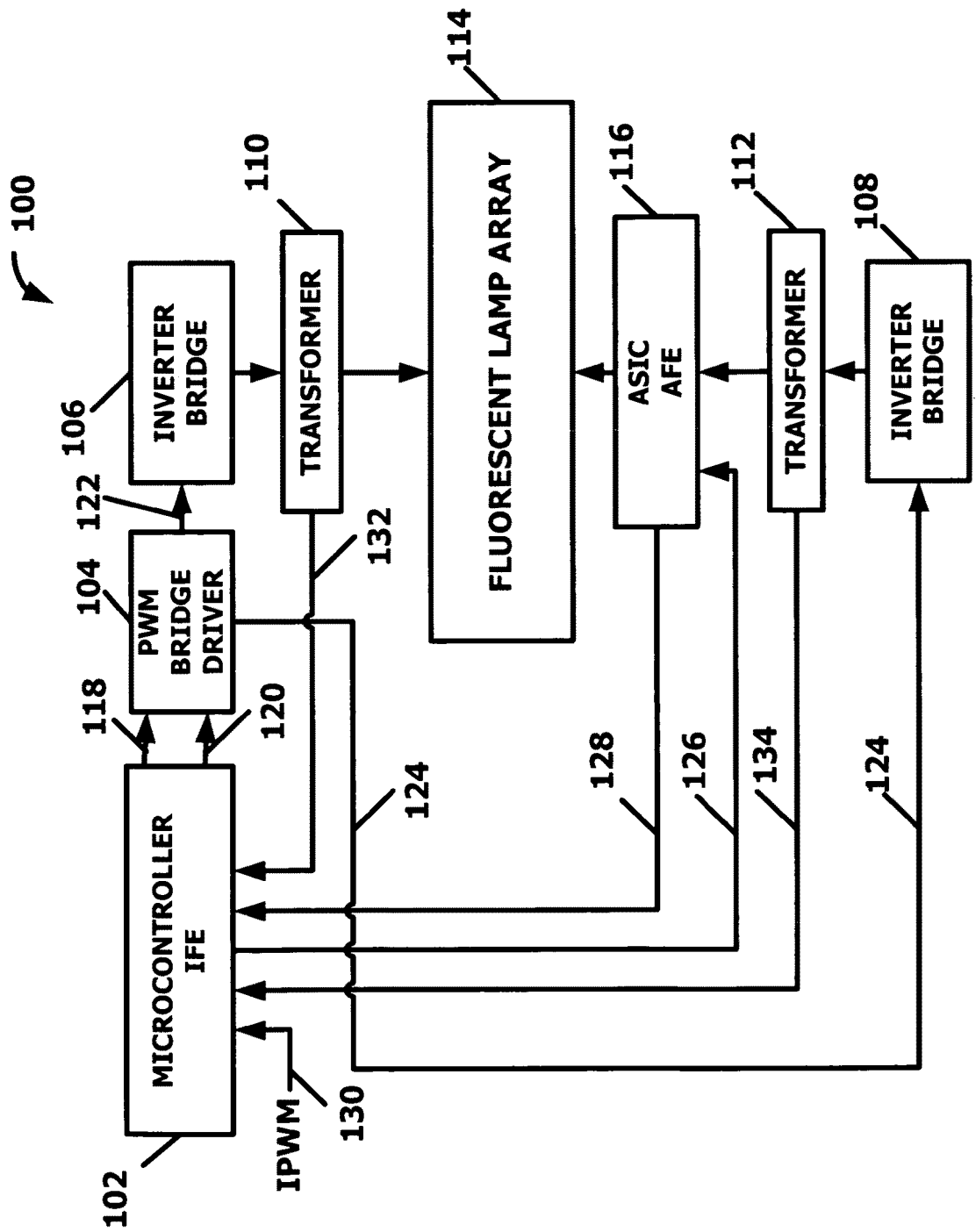
FIG. 1 illustrates a block diagram of a microcontroller circuit for controlling voltage and current in a fluorescent lamp array.

FIG. 1 illustrates a block diagram of a microcontroller circuit 100 for controlling voltage and current in a fluorescent lamp array. Shown in FIG. 1 are an inverter voltage microcontroller 102, a pulse-width modulation (PWM) bridge driver 104, inverter bridges 106 and 108, inverter transformers 110 and 112, an array of fluorescent lamps 114, a load current microcontroller 116, digital switch control signals 118 and 120, switching signals 122 and 124, a sync signal 126, a digital command signal 128, a brightness control signal (IPWM) 130, and transformer current signals 132 and 134.

In FIG. 1, the inverter voltage microcontroller 102 may be implemented, for example, as an integrated circuit microcomputer that can execute instructions from firmware located on-chip. The pulse-width modulation (PWM) bridge driver 104 may be implemented, for example, as a digital circuit that receives the digital switch control signals 118 and 120 from the inverter voltage microcontroller 102 and generates switching signals for the inverter bridge 106. The PWM inverter bridge driver 104 is connected directly to a digital output port of the inverter voltage microcontroller 102 and preferably does not include analog timing components. The inverter bridge 106 may be implemented, for example, as an H-bridge, or full bridge, using common digital switching components. The inverter transformers 110 and 112 may each be implemented, for example, as a pair of transformers connected in parallel to reduce the height of a circuit board used to mount the components of the controller circuit 100. The fluorescent lamps 114 may be implemented, for example, as any type of light-emitting device driven by an inverter, including cold-cathode fluorescent lamps (CCFL) and external electrode fluorescent lamps (EEFL).

In one embodiment, the load current microcontroller 116 includes DMOS FET switches. Each of the switches is connected in series with one of the fluorescent lamps 114 to regulate average load current. Sensor circuits may be included in the load current microcontroller 116 for measuring load current, temperature, and light output of the fluorescent lamps 114.

In operation, the inverter voltage microcontroller 102 sets the inverter voltage output from the inverter transformers 110 and 112 to strike the array of fluorescent lamps 114 and to maintain sufficient load current through each of the fluorescent lamps 114 to provide the desired light output. The load current microcontroller 116 regulates the average current from the transformer 106 through each of the fluorescent lamps 110 to maintain a desired set point for each of the fluorescent lamps 114. The digital command signal 128 may be implemented, for example, as a two-bit digital signal for each of the digital switch control signals 118 and 120 that instructs the inverter voltage microcontroller 102 to increase, decrease, maintain, or shut down each of the inverter voltages output from the inverter transformers 110 and 112.

Figure 2:
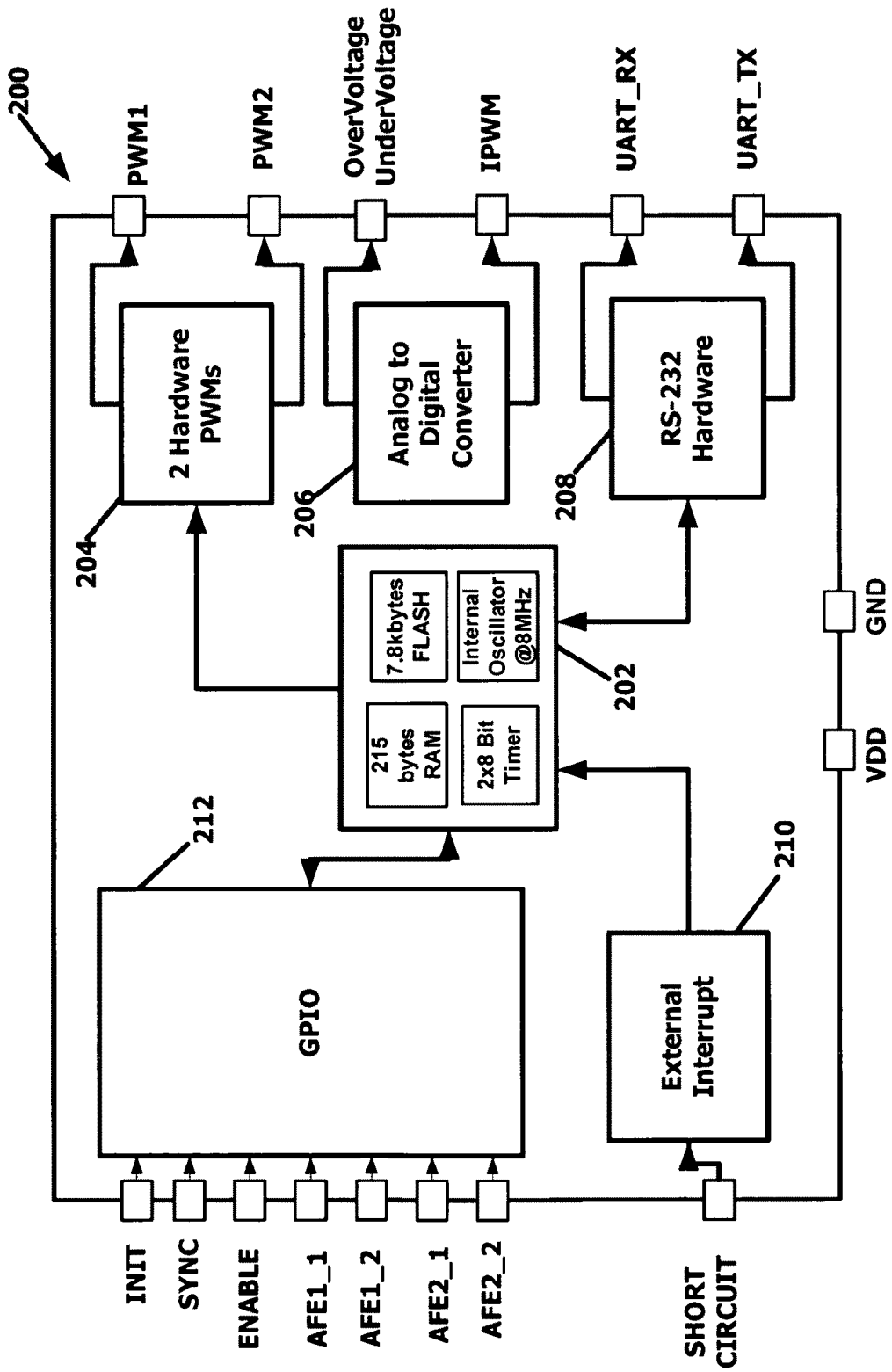
FIG. 2 illustrates a circuit diagram of the inverter voltage microcontroller of FIG. 1.

FIG. 2 illustrates a circuit diagram 200 of the inverter voltage microcontroller 102 of FIG. 1. Shown in FIG. 2 are a microprocessor 202, a pulse-width modulation circuit 204, an analog-to-digital converter 206, an RS-232 interface 208, an external interrupt circuit 210, and a general purpose I/O circuit 212.

In FIG. 2, the microprocessor 202 includes random access memory (RAM), FLASH memory to store firmware, a timer, and an internal clock signal generator. The firmware in the microprocessor 202 is also referred to herein as the inverter firmware engine (IFE). The pulse-width modulation circuit 204 is a digital circuit that generates the switching signals 122 and 124 for the inverter bridges 106 and 108 from the digital switch control signals 118 and 120 in FIG. 1, respectively. The analog-to-digital A/D converter 206 may be implemented, for example, as a 10-bit A/D converter. The RS-232 interface 208 may be used to communicate with a graphical user interface (GUI) or an external display controller. The external interrupt circuit 210 and the general purpose I/O circuit 212 are used to communicate commands between the inverter voltage microcontroller 102 and the load current microcontroller 116. For example, the microprocessor 202 may be a commercially available product such as the Freescale MCU model MC9S08QG8.

In one embodiment, a method of controlling voltage and current for a fluorescent lamp array includes steps of:
a method of controlling voltage and current in an electrical load includes steps of:
calculating a numerically quantized duty cycle of a pulse-width modulated, digital switch control signal by firmware in an inverter voltage microcontroller as a function of an inverter voltage; and
controlling the inverter voltage by adjusting the duty cycle of the digital switch control signal to generate a load current in the electrical load.

Figure 3:
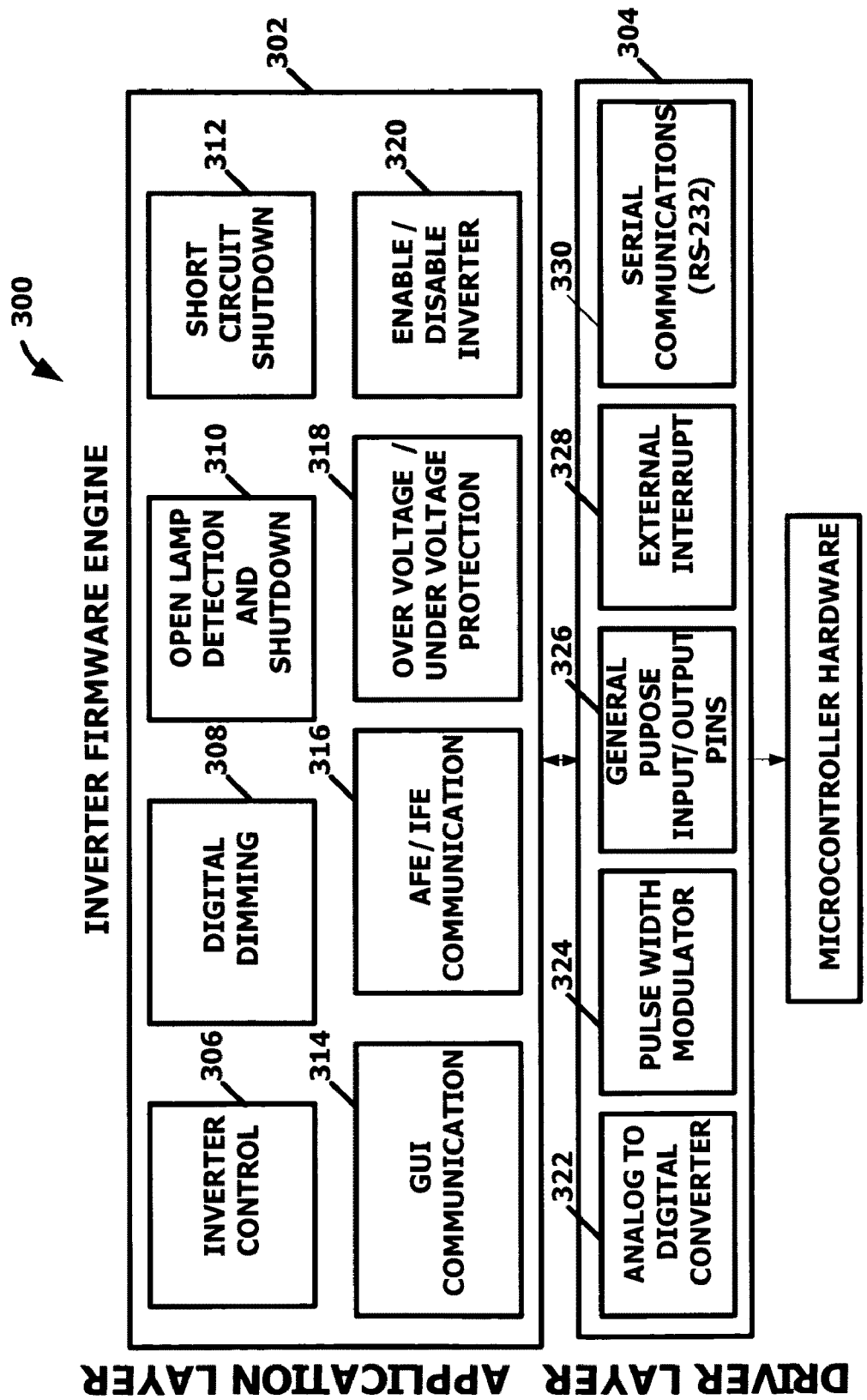
FIG. 3 illustrates a functional diagram of an inverter firmware engine (IFE) for the inverter voltage microcontroller of FIG. 2.

FIG. 3 illustrates a functional diagram 300 of an inverter firmware engine (IFE) for the inverter voltage microcontroller 102 of FIG. 2. Shown in FIG. 3 are an application layer 302, a driver layer 304, an inverter control function 306, a digital dimming function 308, a lamp fault detection function 310, a transformer short circuit detection function 312, an external device communications function 314, a digital command function 316, an over voltage/under voltage detection function 318, an enable/disable function 320, an analog-to-digital function 322, a pulse-width modulation function 324, a general purpose I/O function 326, an external interrupt function 328, and a serial communications function 330.

In FIG. 3, the inverter control function 306, the digital dimming function 308, the lamp fault detection function 310, the transformer short circuit detection function 312, the external device communications function 314, the digital command function 316, the over voltage/under voltage detection function 318, and the enable/disable function 320 are included in the application layer 302. The analog-to-digital function 322, the pulse-width modulation function 324, the general purpose I/O function 326, the external interrupt function 328, and the serial communications function 330 are included in the driver layer 304. Each of these functions is explained in detail below.

Figure 4:
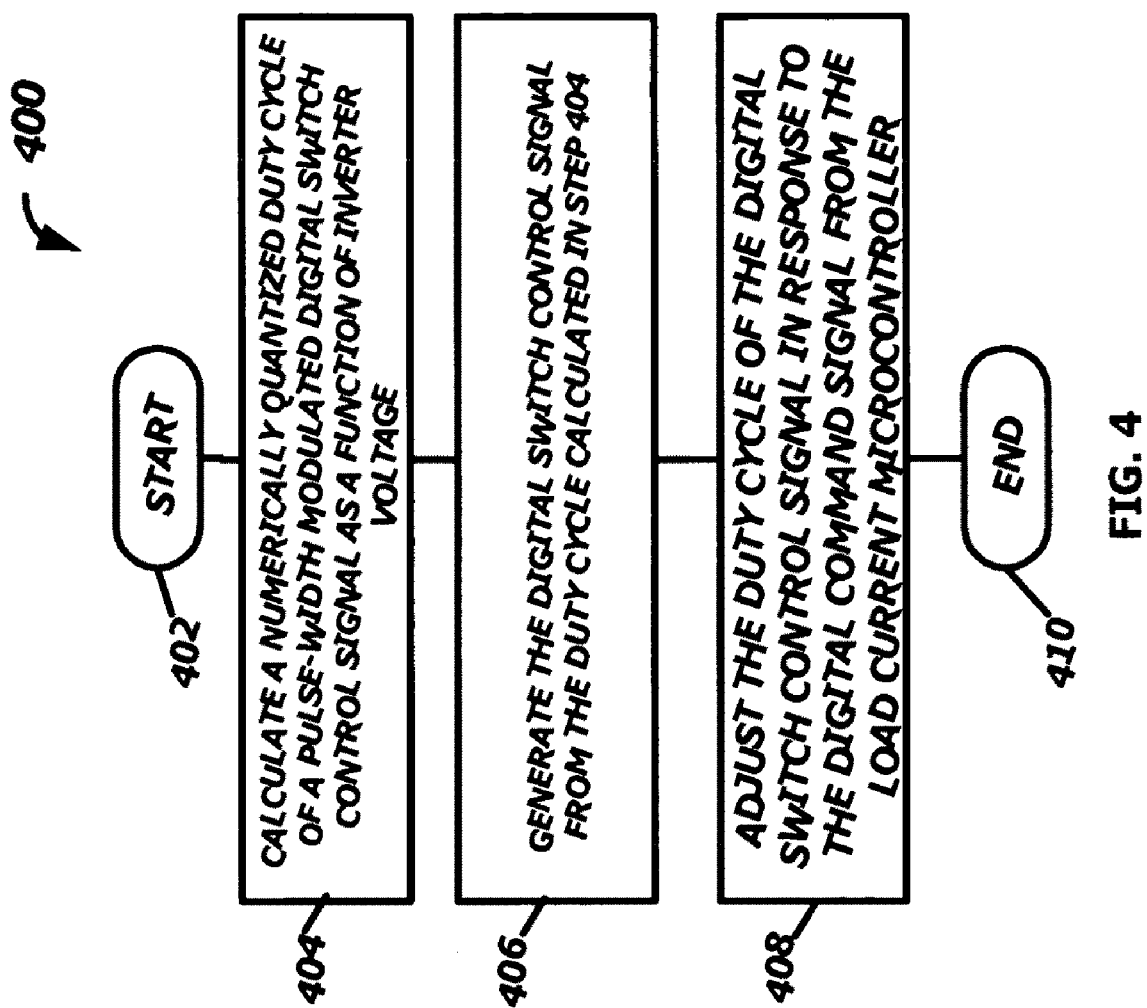
FIG. 4 illustrates a flow chart for the IFE of FIG. 3.

FIG. 4 illustrates a flow chart 400 for a method of controlling voltage with the IFE in FIG. 3.

Step 402 is the entry point of the flow chart 400.

In step 404, the IFE calculates a numerically quantized duty cycle of a pulse-width modulated digital switch control signal as a function of inverter voltage, for example, by retrieving default values from a calibration database stored in FLASH memory or by calculating a polynomial function of the duty cycle from a parameter such as load current. Because the value of the duty cycle for each of the digital switch control signals 118 and 120 is a percentage expressed as a number in the IFE, the duty cycle is numerically quantized, in contrast to analog representations of the duty cycle as a voltage or a current, which are typically are dependent on manufacturing variations and temperature conditions. By numerically quantizing the duty cycle as a number in firmware, the problem of instability in analog circuits is advantageously avoided, and the inverter voltage output from the transformers 110 and 112 may be accurately and precisely controlled for demanding applications such as backlights for liquid crystal displays. The IFE generates each of the digital switch control signals 118 and 120, for example, by gating the digital switch control signal 118 or 120 ON for a number of system clock cycles (PWM ON time) corresponding to the duty cycle percentage and gating the PWM inverter switch control signal 118 or 120 OFF for an additional number of system clock cycles (PWM OFF time). The total number of clock cycles defines the period of the digital switch control signal 118 or 120. Increasing or decreasing the duty cycle results in a corresponding increase or decrease in the inverter voltage output from the transformers 110 and 112. The duty cycle of each of the digital switch control signals 118 and 120 may be expressed as:

$$\text{duty cycle}=\text{switch ON time}/(\text{switch ON time}+\text{switch OFF time}) \quad (1)$$

In step 406, the IFE generates each of the digital switch control signals 118 and 120 from the duty cycle calculated in step 404. Each of the digital switch control signals 118 and 120 is received by the PWM bridge driver 104, which generates the switching signals for the corresponding inverter bridge 106 or 108. The duty cycle adjustments to the digital switch control signals 118 and 120 during operation ensure that the inverter voltage output is sufficient to drive the array of fluorescent lamps 114 to the desired load current set point.

During an inverter shutdown in response to, for example, a transformer short circuit, a load open circuit, a load short circuit, an inverter disable signal, or an inverter bridge over voltage/under voltage signal, the duty cycle of the digital switch control signals 118 and 120 is zero, that is, the digital switch control signals 118 and 120 are driven to the low or OFF state so that no current flows in the switches of the inverter bridges 106 and 108. The digital switch control signals 118 and 120 are also driven low during the OFF state of the digital dimming duty cycle.

In step 408, the IFE adjusts the duty cycle of each of the pulse-width modulated digital switch control signals 118 and 120 in response to the digital command signal 128 from the load current microcontroller 116 as follows.

In the first state, the IFE maintains the value of the corresponding inverter voltage at its present value. This state is set when the average load current of the array of fluorescent lamps has reached the set point value.

In the second state, the IFE increases the corresponding inverter voltage by incrementing the duty cycle of the corresponding digital switch control signal 118 or 120 by a numerically quantized increment, for example, one percent. Using a numerically quantized increment advantageously avoids timing variations with temperature and component values that are typical of a continuously adjusted duty cycle in analog circuits. As a result, the inverter voltage may be controlled with greater precision and accuracy.

In the third state, the IFE decreases the corresponding inverter voltage by decrementing the duty cycle of the corresponding digital switch control signal 118 or 120 by a numerically quantized increment, for example, one percent.

In the fourth state, the IFE shuts down the inverter in response to, for example, a load short circuit or a load open circuit. The IFE sets the duty cycle of both of the digital switch control signals 118 and 120 to zero, that is, the digital switch control signals 118 and 120 are driven to the low or OFF state so that no current flows in the switches of the inverter bridges 106 and 108. The digital switch control signals 118 and 120 are driven low until the inverter voltage microcontroller 102 is powered off and on.

Step 410 is the exit point of the flow chart 400.

The method of FIG. 4 described above for the IFE may be embodied in a disk, a CD-ROM, and other computer readable media for loading and executing on a computer according to well-known computer programming techniques.

Figure 5:
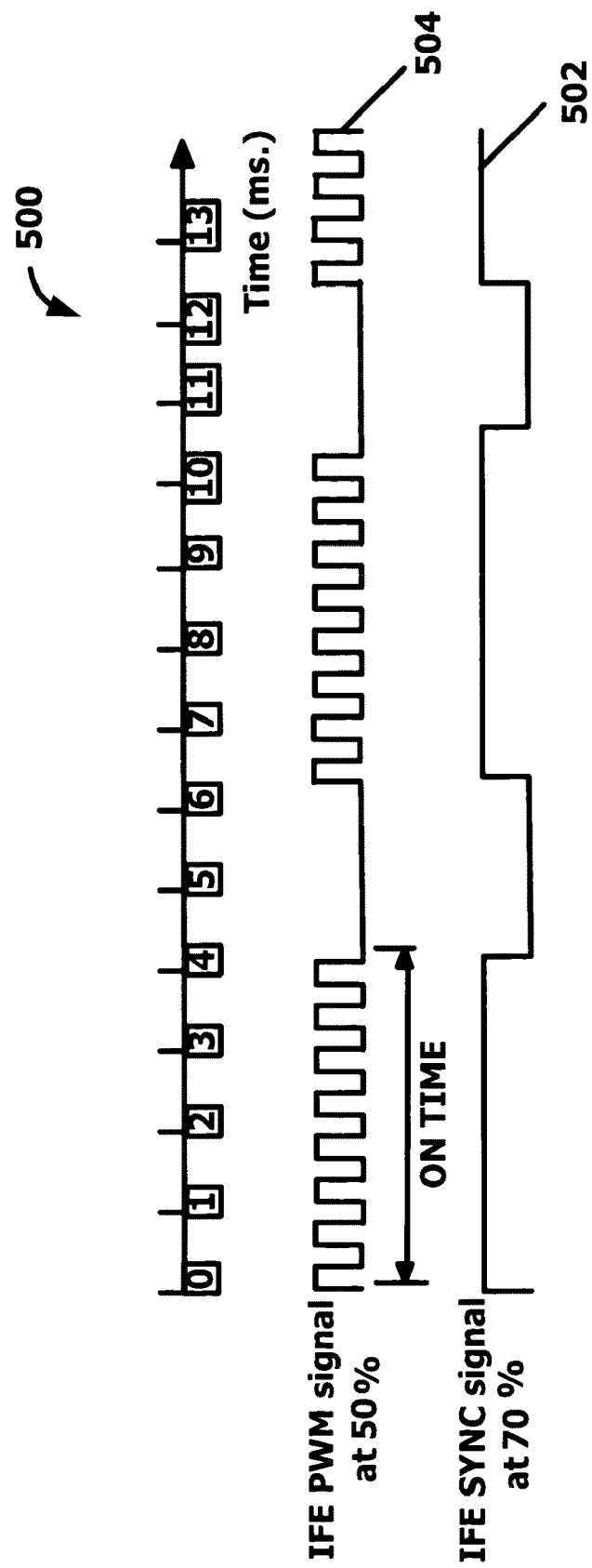
FIG. 5 illustrates a timing diagram of the IFE digital dimming function in FIG. 3.

FIG. 5 illustrates a timing diagram 500 of the IFE digital dimming function 308 in FIG. 3. Shown in FIG. 5 are a SYNC 502 and a digital switch control signal 504.

The IFE receives the digitized brightness control signal (IPWM) 130 from the A/D converter 206 in FIG. 2 and generates a dimming duty cycle from a DC voltage of the brightness control signal (IPWM) 130. The IFE modulates the digital switch control signal 504 by the dimming duty cycle to switch the inverter voltage on and off at a frequency of about 160 Hz to 200 Hz to avoid lamp flicker. The IFE also transmits the pulse-width modulated SYNC signal 502 having a duty cycle equal to the dimming duty cycle to the load current microcontroller 116. The load current microcontroller 116 modulates a digital switch control signal for each of the fluorescent lamps 114 by the SYNC signal 502.

The IFE also compares the DC supply voltage of each of the inverter bridges 106 and 108, for example, from the A/D converter 206 in FIG. 2 with over voltage and under voltage threshold values stored in a calibration database in the IFE to detect an over voltage/under voltage condition. The over voltage/under voltage condition is true when the inverter voltage from either of the inverter transformers 110 and 112 is greater than the over voltage threshold or less than the under voltage threshold. When the over voltage/under voltage condition is true, the IFE stores the duty cycle of the digital switch control signals 118 and 120 in memory and sets the duty cycle of the digital switch control signals 118 and 120 to zero, that is, the digital switch control signals 118 and 120 are driven to the low or OFF state so that no current flows in the switches of the inverter bridges 106 and 108. When the IFE detects that the inverter voltage has returned to an operating range, preferably well inside the over voltage and the under voltage threshold values, then the IFE restores the duty cycle of the digital switch control signals 118 and 120 to the value stored in memory, and the inverter operation returns to normal.

Figure 6:
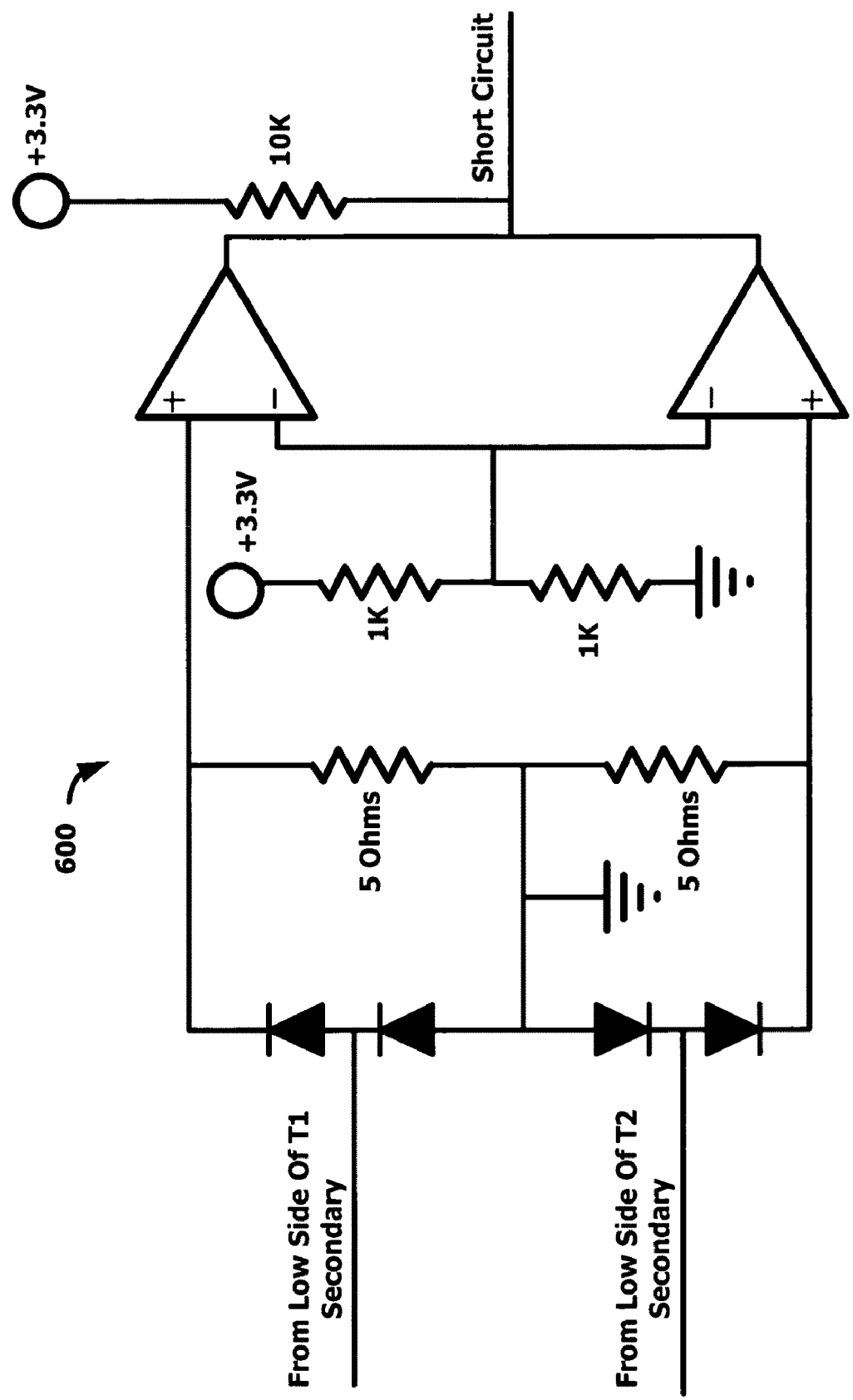
FIG. 6 illustrates a circuit for detecting a short circuit in the inverter transformers for the IFE of FIG. 3.

FIG. 6 illustrates a circuit 600 for detecting a short circuit in one of the inverter transformers 110 and 112 in FIG. 1. If the secondary current of either of the transformers 110 and 112 exceeds a predetermined threshold, then one of the comparators generates a short circuit signal at the input of the external interrupt circuit 210 in FIG. 2. When the IFE detects the transformer short circuit signal, the IFE sets the duty cycle of both of the digital switch control signals 118 and 120 to zero so that no current flows in the switches of the inverter bridges 106 and 108. The digital switch control signals 118 and 120 are driven low until the inverter voltage microcontroller 102 is powered off and on.

The IFE monitors the ENABLE signal connected to the general purpose I/O circuit 212 in FIG. 2 to determine whether the inverter voltages should be on or off. When the ENABLE signal is true, the inverter voltages are not affected.

When the ENABLE signal is false, the IFE drives the digital switch control signals 118 and 120 low until the ENABLE signal is true. The ENABLE signal may be used, for example, to avoid an electric shock hazard to technical personnel during manual circuit checks.

Figure 7:
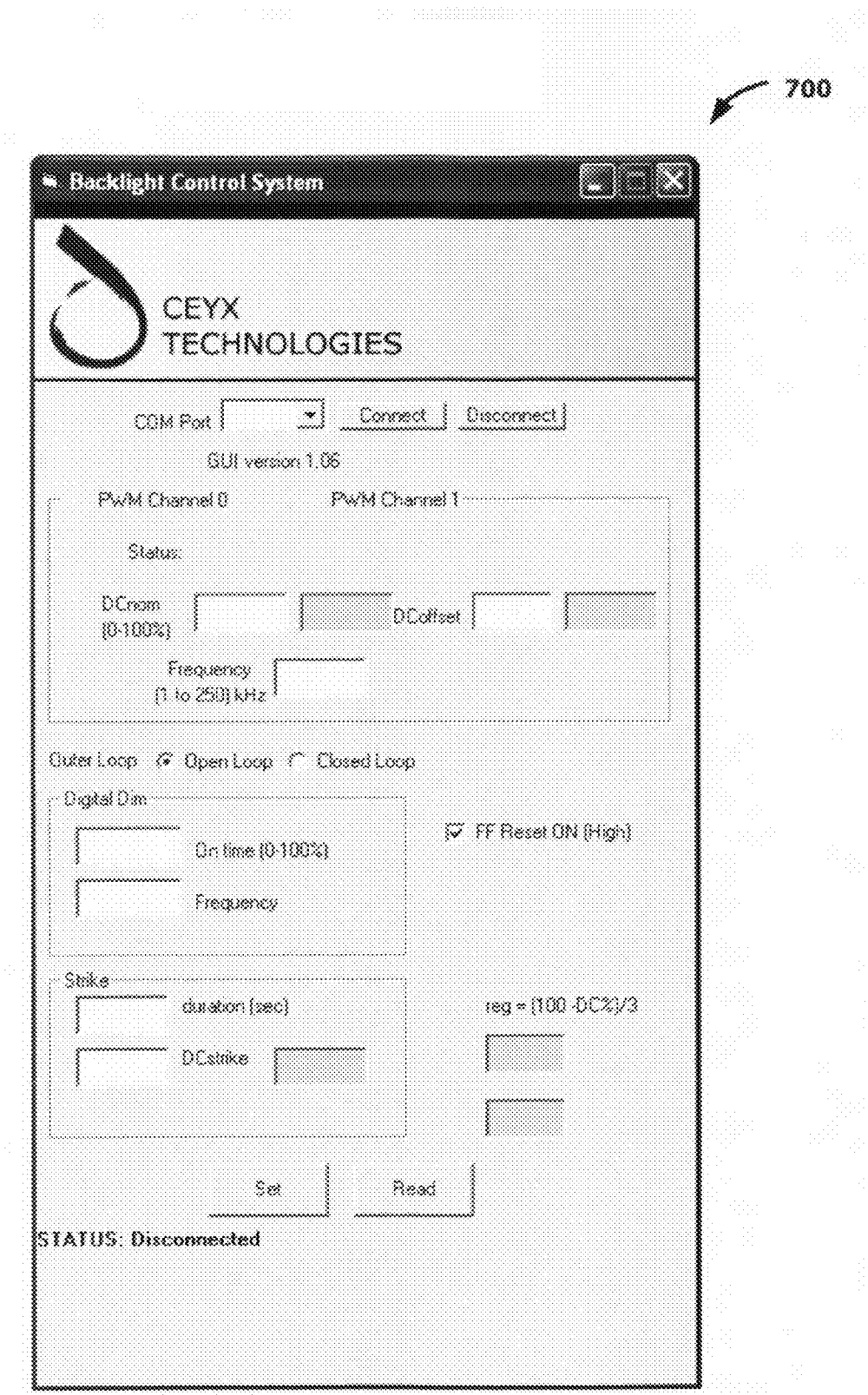
FIG. 7 illustrates a graphical user interface (GUI) for communicating parameters between the IFE of FIG. 3 and a PC.

FIG. 7 illustrates a graphical user interface (GUI) 700 for communicating parameters between the IFE of FIG. 3 and a PC. The IFE can communicate over the RS-232 interface 208 with an external device, for example, a personal computer (PC), to receive and transmit parameters between the IFE and an application program to calibrate and test the array of fluorescent lamps 114. Examples of parameters that may be communicated between the IFE and an external device over the RS-232 interface 208 include the duty cycle of each of the digital switch control signals 118 and 120, the difference or offset between duty cycles of the digital switch control signals 118 and 120, the frequency of the digital switch control signals 118 and 120, the dimming duty cycle, a servo mode signal, a strike voltage time interval, and the duty cycle of each of the digital switch control signals 118 and 120 during the strike voltage time interval.

The IFE can also generate the INIT signal from the general purpose I/O circuit 212 in FIG. 2 to the load current microcontroller 116 to reset the digital logic in the inverter voltage microcontroller 102 and the load current microcontroller 116 to a known state.

In another embodiment, a method for controlling voltage and current in an electrical load includes steps of:
calculating a numerically quantized duty cycle of a pulse-width modulated, digital switch control signal by firmware in a load current microcontroller as a function of a load current in the electrical load; and
controlling the load current by adjusting the duty cycle of the digital switch control signal when an inverter voltage is applied to the electrical load.

Figure 8:
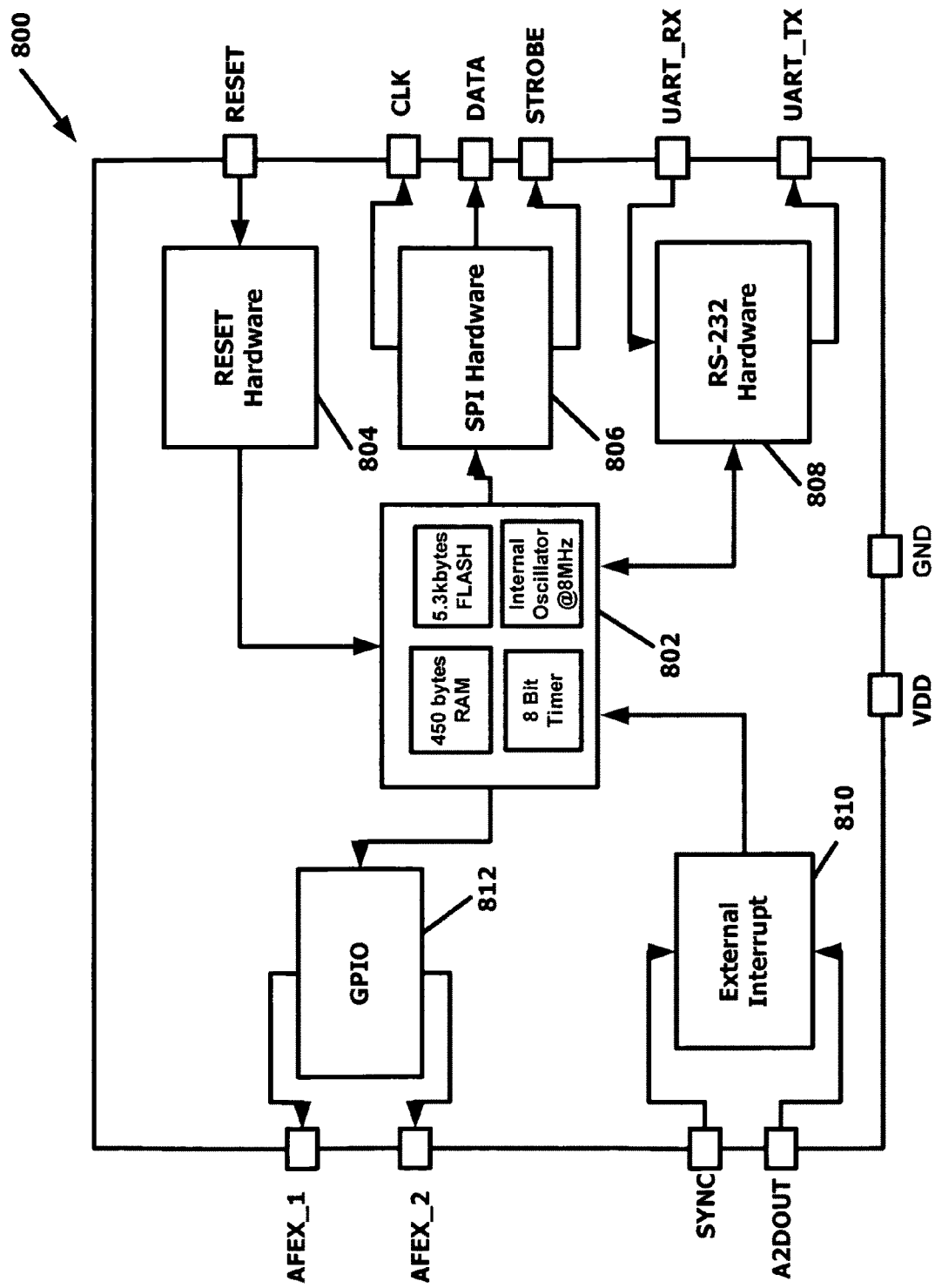
FIG. 8 illustrates a circuit diagram of the load current microcontroller 116 of FIG. 1.

FIG. 8 illustrates a circuit diagram 800 of the load current microcontroller 116 of FIG. 1. Shown in FIG. 8 are a microprocessor 802, a reset circuit 804, a serial peripheral interface (SPI) 806, an RS-232 interface 808, an external interrupt circuit 810, and a general purpose I/O circuit 812.

In FIG. 8, the microprocessor 802 includes random access memory (RAM), FLASH memory to store firmware, a timer, and an internal clock signal generator. The firmware in the microprocessor 802 is also referred to herein as the ASIC firmware engine (AFE). The reset circuit 804 is a digital circuit that receives a system reset signal to initialize digital logic in the load current microcontroller 116. The SPI circuit 806 generates a clock signal, a data signal, and a strobe signal. The RS-232 interface 808 may be used to communicate with a graphical user interface (GUI) or an external display controller. The external interrupt circuit 810 and the general purpose I/O circuit 812 are used to communicate commands between the inverter voltage microcontroller 102 and the load current microcontroller 116. For example, the microprocessor 802 may be a commercially available product such as the Freescale MCU model MC9S08QG8.

Figure 9:
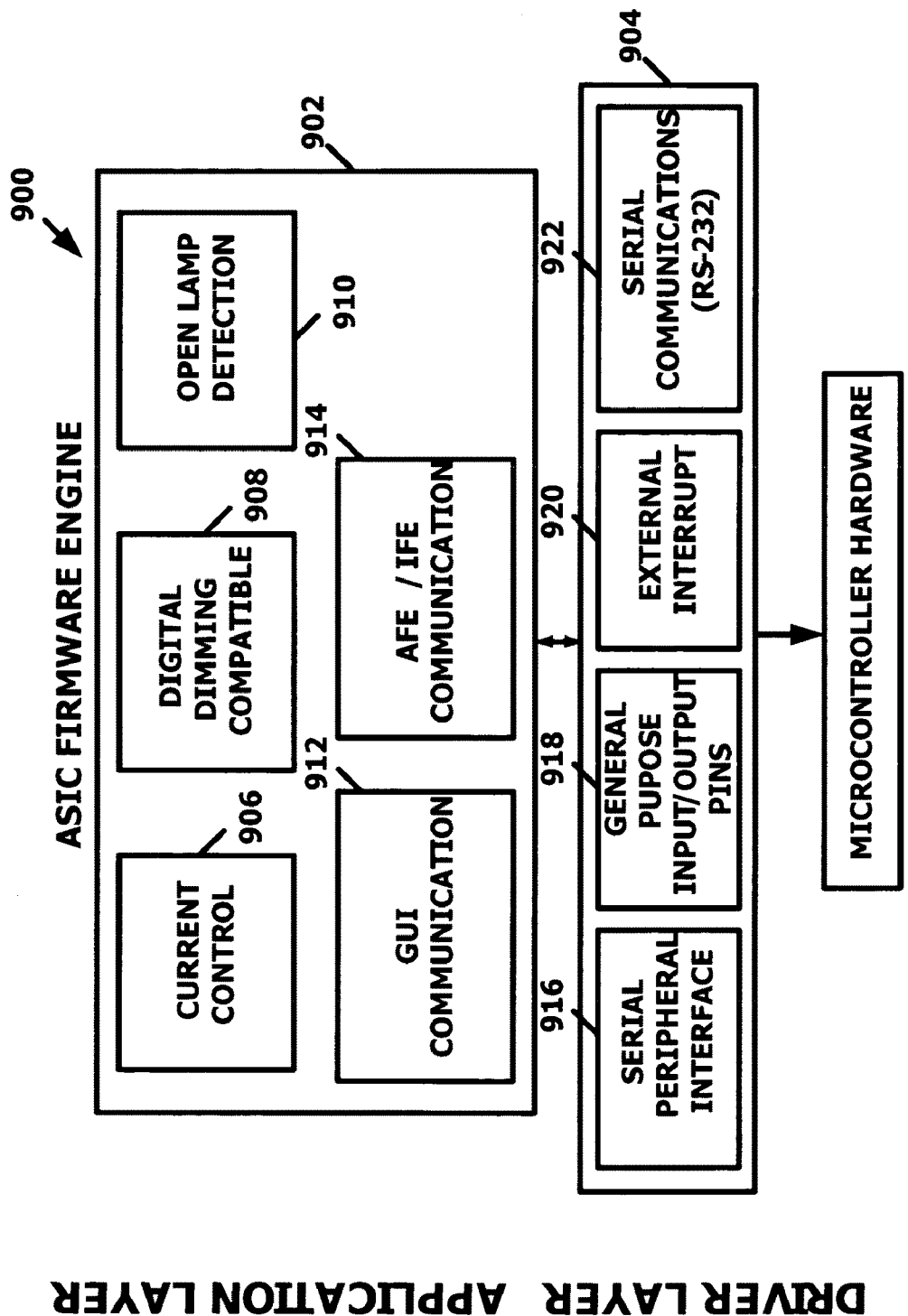
FIG. 9 illustrates a functional diagram of an ASIC firmware engine (AFE) for the load current microcontroller in FIG. 8.

FIG. 9 illustrates a functional diagram 900 of an ASIC firmware engine (AFE) for the load current microcontroller 800 in FIG. 8. Shown in FIG. 9 are an application layer 902, a driver layer 904, a current control function 906, a digital dimming function 908, a fault detection function 910, an external device communications function 912, a digital command function 914, a serial peripheral interface (SPI) 916, a general purpose I/O function 918, an external interrupt function 920, and a serial communications function 922.

In FIG. 9, the current control function 906, the digital dimming function 908, the fault detection function 910, the external device communications function 912, and the digital command function 914 are included in the application layer 902. The serial peripheral interface (SPI) 916, the general purpose I/O function 918, the external interrupt function 920, and the serial communications function 922 are included in the driver layer 904. Each of these functions is described in detail below.

Figure 10A:
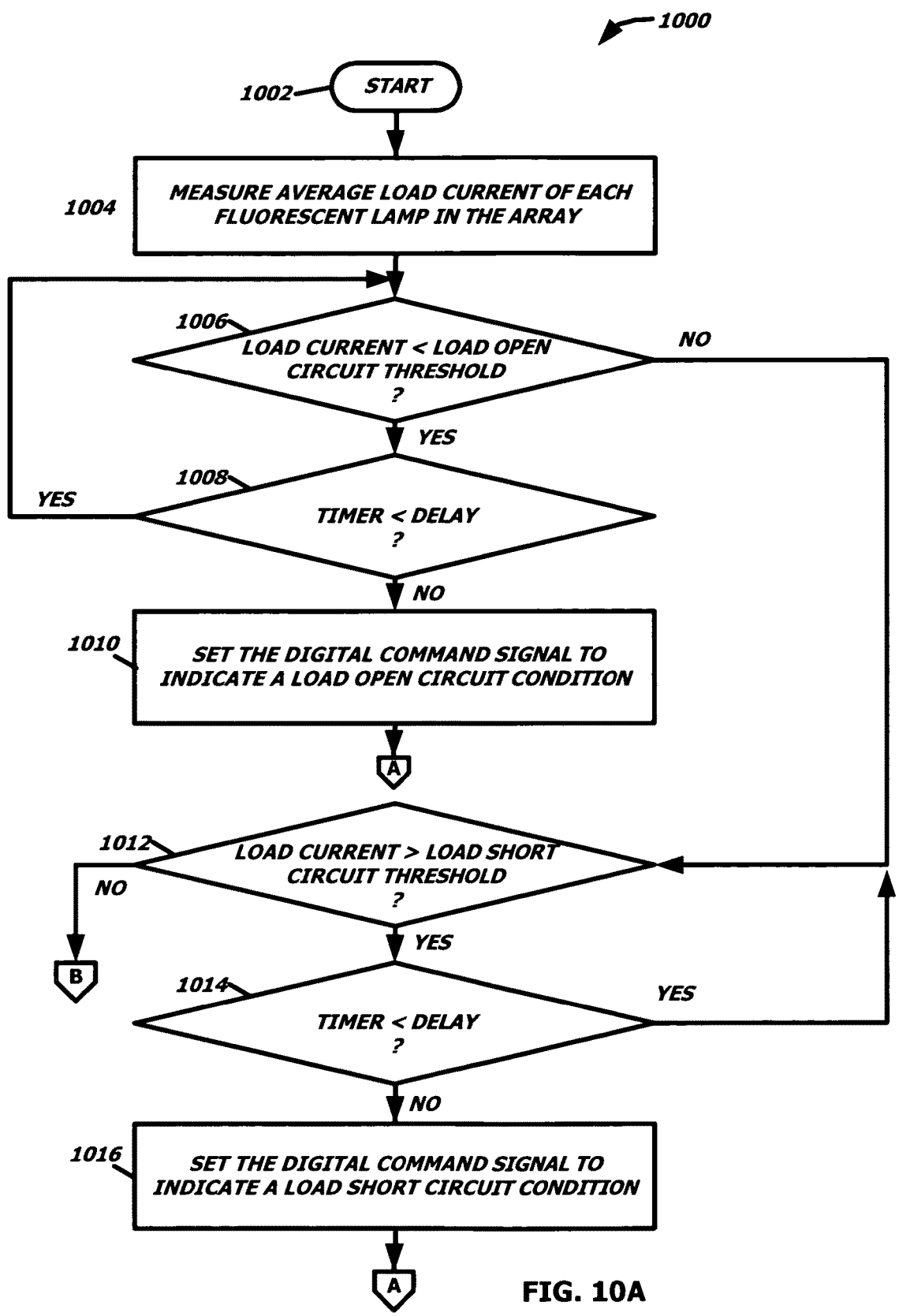
FIG. 10 illustrates a flow chart for a method of controlling current with the AFE of FIG. 9.
Figure 10B:
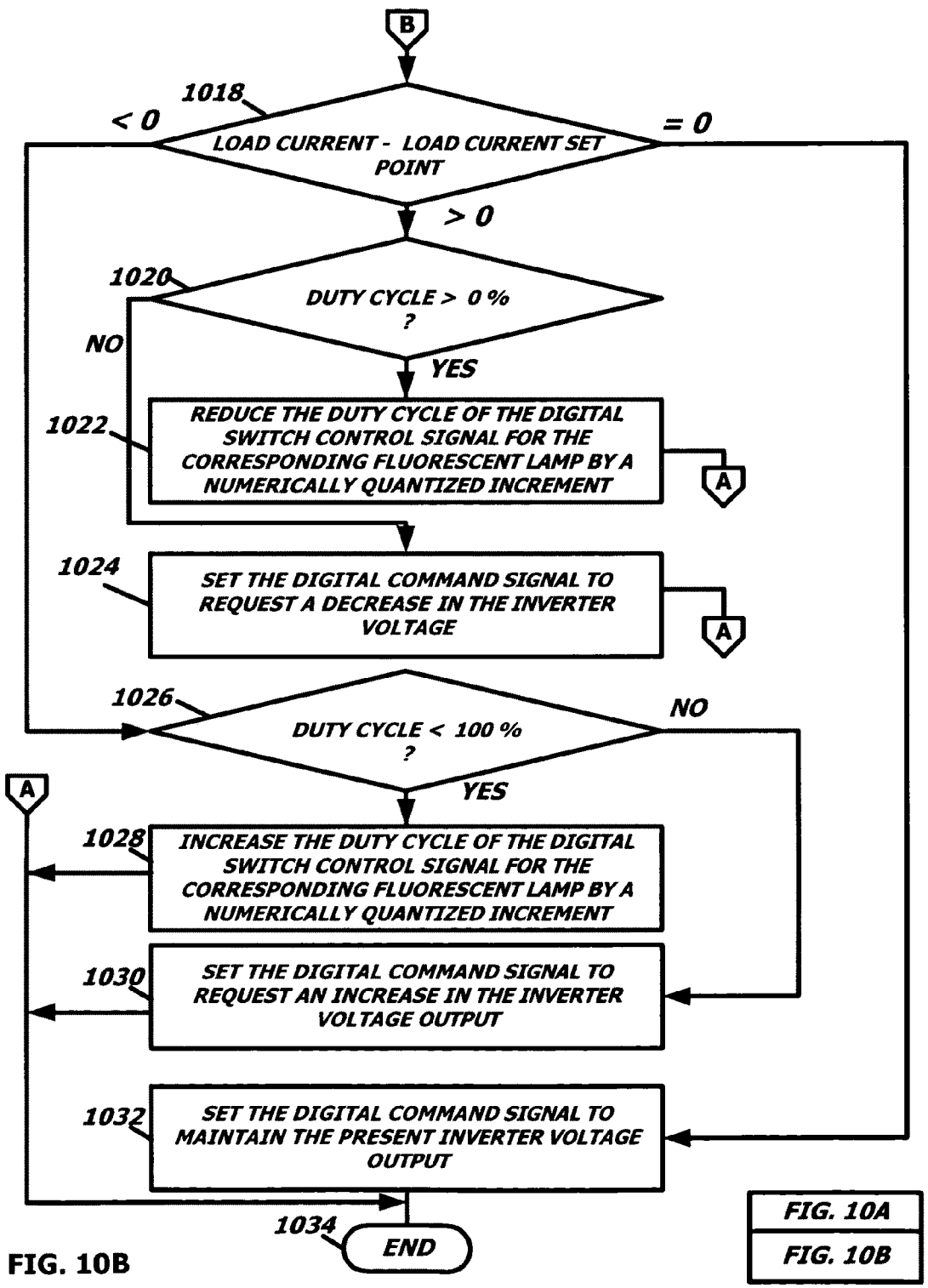

FIG. 10 illustrates a flow chart 1000 for a method of controlling current with the AFE of FIG. 9.

Step 1002 is the entry point of the flow chart 1000.

In step 1004, the AFE measures average load current of each fluorescent lamp in the array, for example, by dual-slope integration.

In step 1006, the AFE compares each load current to a load open circuit threshold. The load open circuit threshold is a selected current value that is below the minimum operating current for the type of fluorescent lamp being used in the array. If none of the load currents is less than the load open circuit threshold, then the method continues from step 1012. Otherwise, the method continues from step 1008.

In step 1008, the AFE compares a timer to a predetermined delay selected to avoid mistaking a circuit transient or glitch for an open circuit. If the timer value is less than the delay, then the method continues from step 1006. Otherwise, the method continues from step 1010.

In step 1010, the AFE sets the digital command signal 128 to indicate a load open circuit condition, and the method continues from step 1034. In step 1012, the AFE compares each load current to a load short circuit threshold. The load short circuit threshold is a selected current value that is above the maximum operating current for the type of fluorescent lamp being used in the array. If none of the load currents is greater than the load short circuit threshold, then the method continues from step 1018. Otherwise, the method continues from step 1014.

In step 1014, the AFE compares a timer to a predetermined delay selected to avoid mistaking a circuit transient or glitch for a short circuit. If the timer value is less than the delay, then the method continues from step 1012. Otherwise, the method continues from step 1016.

In step 1016, the AFE sets the digital command signal 128 to indicate a load short circuit condition, and the method continues from step 1034. In step 1018, the AFE compares each load current to a corresponding load current set point. The load current set point may be determined, for example, during calibration of the array of fluorescent lamps and may be stored in the calibration database in the AFE. If the selected load current is greater than the load current set point, then the method continues from step 1020. If the selected load current is less than the load current set point, then the method continues from step 1026. If the selected load current is equal to the load current set point, then the method continues from step 1032.

In step 1020, if the duty cycle of the digital switch control signal for the corresponding fluorescent lamp is greater than zero percent, then the method continues from step 1022. Otherwise, the method continues from step 1024.

In step 1022, the AFE reduces the duty cycle of the digital switch control signal for the corresponding fluorescent lamp by a numerically quantized increment, for example, one percent, and the method continues from step 1034.

In step 1024, the AFE sets the digital command signal 128 to request a decrease in the inverter voltage, and the method continues from step 1034.

In step 1026, if the duty cycle of the digital switch control signal for the corresponding fluorescent lamp is less than 100 percent, then the method continues from step 1028. Otherwise, the method continues from step 1030.

In step 1028, the AFE increases the duty cycle of the digital switch control signal for the corresponding fluorescent lamp by a numerically quantized increment, and the method continues from step 1034.

In step 1030, the AFE sets the digital command signal 128 to request an increase in the inverter voltage output, and the method continues from step 1034.

In step 1032, the AFE sets the digital command signal 128 to maintain the present inverter voltage output.

Step 1034 is the exit point of the flow chart 1000.

Figure 11:
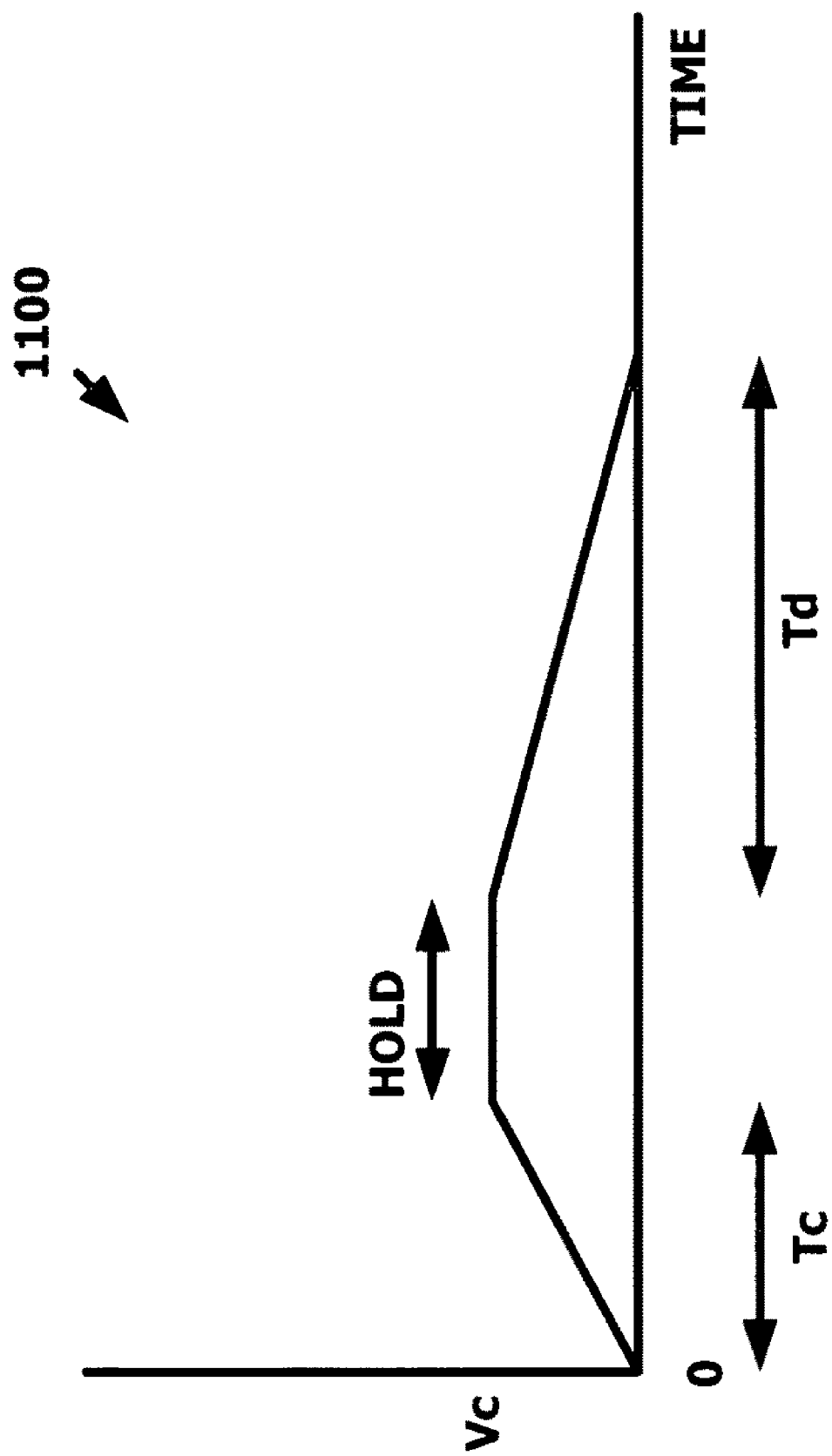
FIG. 11 illustrates a timing diagram of dual-slope integration for measuring load current with the AFE of FIG. 10.

FIG. 11 illustrates a timing diagram 1100 of dual-slope integration for measuring load current with the AFE of FIG. 10. In dual-slope integration, a sample/hold capacitor is charged by the load current for a predetermined time interval $T_C$ and discharged by a known reference current $I_{REF}$ for a measured time interval $T_D$. The load current $I_L$ is given by:

$$I_L = T_D \times \frac{\pi}{2} \times \frac{I_{REF}}{T_C} \qquad (2)$$

where $$\frac{\pi}{2}$$

is a conversion factor from DC to rms.

The AFE charges the capacitor with the load current from zero volts to the non-zero voltage $V_C$ during the time interval $T_C$ determined by the timer in the microprocessor 802. For example, $T_C$ may be one dimming cycle at 200 Hz, or 5 ms. When the charging time ends, the charging current is switched off, and the capacitor voltage $V_C$ remains constant. The IFE switches the capacitor to the known reference current $I_{REF}$ and starts the timer in the microprocessor. When the capacitor voltage reaches zero, a comparator drives the A2DOUT input of the load current controller 116 to generate an interrupt to the AFE that stops the timer in the microprocessor 802. The AFE then reads the timer value $T_D$ to calculate the load current from equation (2).

Figure 12:
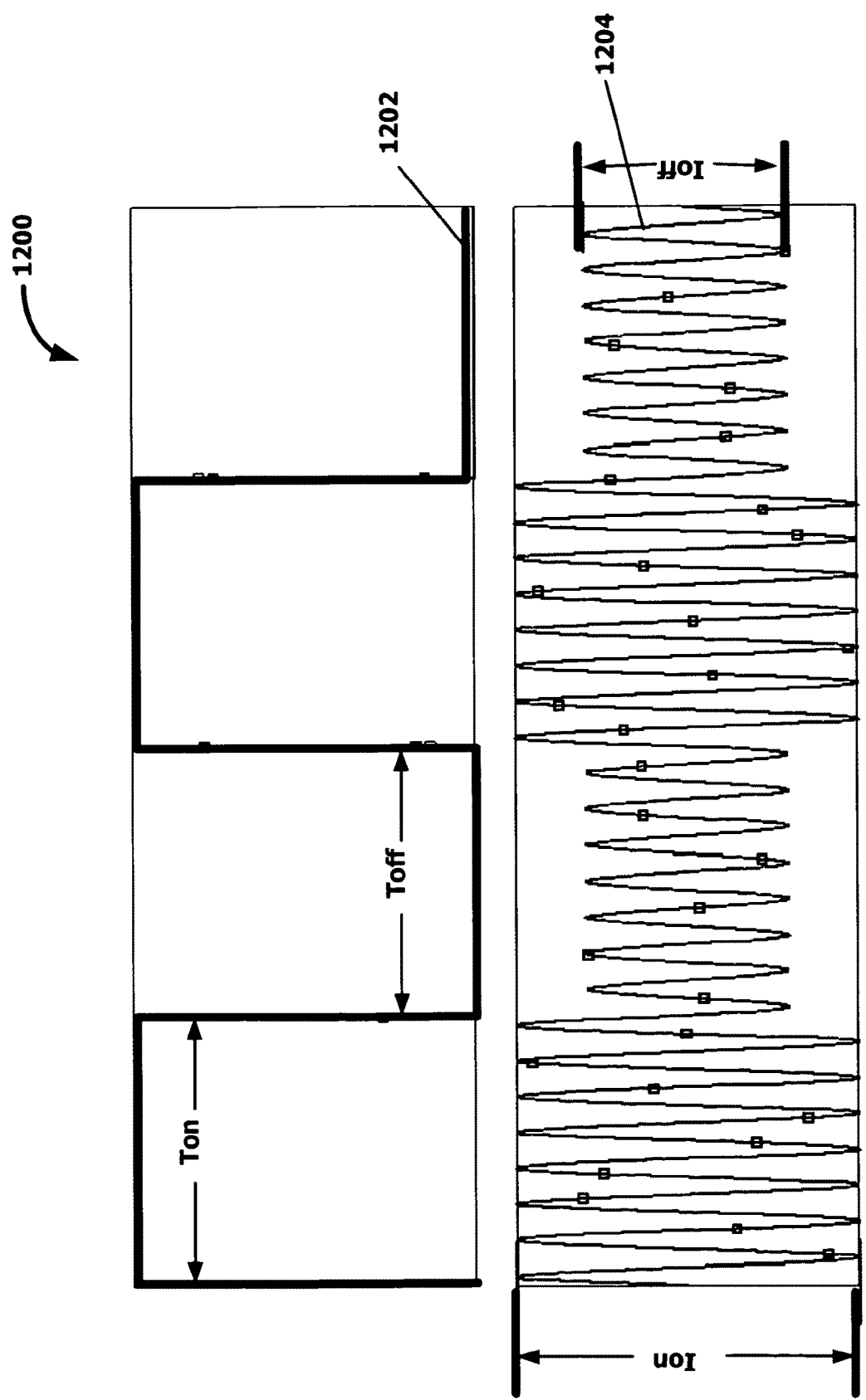
FIG. 12 illustrates a timing diagram of the amplitude-shift modulated load current regulation performed by the AFE of FIG. 10.

FIG. 12 illustrates a timing diagram 1200 of the amplitude-shift modulated load current regulation performed by the AFE of FIG. 10. Shown in FIG. 12 are a digital switch control signal 1202 and an amplitude-shift modulated load current 1204. The AFE calculates a numerically quantized duty cycle of the pulse-width modulated, digital switch control signal 1202 and adjusts the duty cycle in the same manner described above for the IFE to regulate the load current in a corresponding one of the fluorescent lamps 114. The digital switch control signal 1202 drives a high-voltage switch, for example, a DMOS FET connected in series with one of the fluorescent lamps and in parallel with a load resistor. When the digital switch is in the OFF state, the load resistor limits the load current to the lower range of the amplitude-shift modulated load current 1204. When the digital switch is in the ON state, the load resistor is bypassed, and the load current is limited by the lamp impedance to the higher range of the amplitude-shift modulated load current 1204. The average load current is regulated by the duty cycle of the digital switch control signal 1202, which is 50 percent in the example shown. The load current increases to a maximum as the duty cycle is increased to 100 percent and decreases to a minimum as the duty cycle is decreased to zero percent. A DMOS FET switch for each fluorescent lamp and the associated circuitry may be economically packaged in an ASIC for the load current controller 116 of FIG. 1. The digital switch control signals 1202 may be generated for an array of ten fluorescent lamps concurrently by shifting digital samples into the serial peripheral interface (SPI) 916 at a shift rate, for example, of 4 MHz.

In open loop operation, the AFE adjusts the duty cycle of the digital switch control signal 1202 by identical increments to reach the set point value as illustrated in the flow chart 1000 of FIG. 10. Alternatively, the AFE may use a closed loop digital servo to calculate the duty cycle of the digital switch control signal 1202 using a proportional integral algorithm.

Figure 13:
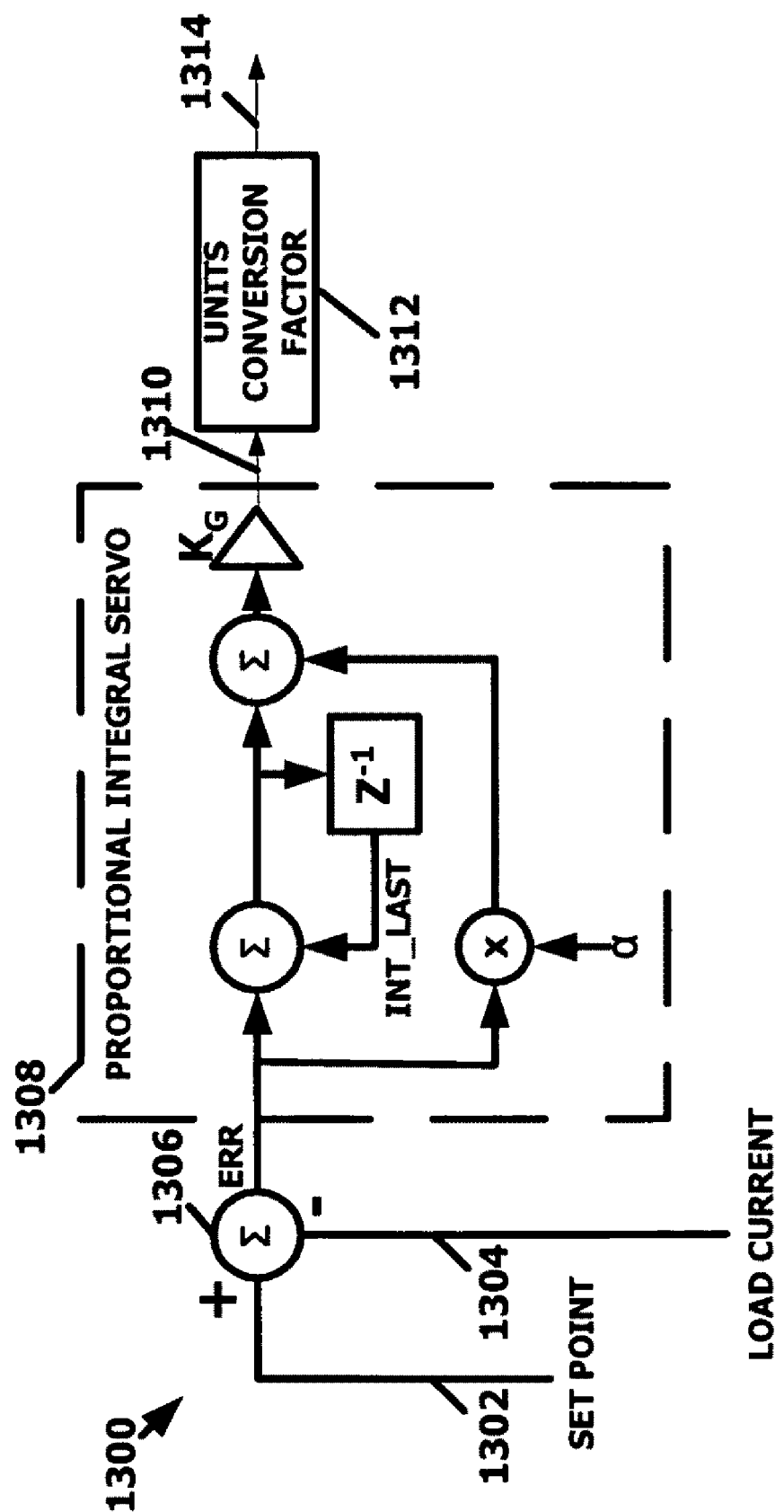
FIG. 13 illustrates a schematic diagram of a closed loop digital servo for calculating the duty cycle of the digital switch control signals for the load current controller of FIG. 1.

FIG. 13 illustrates a schematic diagram 1300 of a closed loop digital servo for calculating the duty cycle of the digital switch control signals for the load current controller 116 of FIG. 1. Shown in FIG. 13 are a load current set point 1302, a load current 1304, a summing function 1306, a proportional integral servo 1308, an adjustment value 1310, a units conversion factor 1312, and a duty cycle correction value 1314.

In FIG. 13, the load current set point 1302 corresponds to the desired load current of one of the array of the fluorescent lamps 114 in FIG. 1. In one embodiment, the load current set point value 1302 is determined during calibration and stored in the calibration database in the AFE. The load current 1304 may be measured by the AFE as described above with reference to FIG. 11.

The AFE subtracts the load current set point 1302 from the load current 1304 by the summing function 1306 to generate the error signal err according to the equation:

$$\text{err} = \text{Set\_Point} - \text{Load Current} \qquad (3)$$

The resulting error signal err from the summing function 1306 is subjected to the proportional integral servo 1308 to generate the adjustment value 1310 for the selected parameter according to the equation:

$$\text{Adjustment\_value} = (\alpha * \text{err} + \text{int\_last}) * KG \qquad (4)$$

where

Adjustment_value is the integrated error output;

$\alpha$ is a feedback constant;

int_last is the cumulative sum of the current and previous values of err; and $K_G$ is a loop gain constant.

In one embodiment, the loop gain $K_G = 1.975 \times 10^{-3}$ and $\alpha = 39.5$ to provide a damping ratio of 0.9 to allow for open loop variation tolerances. In this example, the servo loop is performed at periodic intervals of two seconds.

The error signal err is summed with the previous errors:

$$\text{int\_last} = \text{int\_last} + \text{err} \qquad (5)$$

The proportional integral servo 1308 is preferably embodied in the AFE according to well-known programming techniques and calculated by the microprocessor 802 in FIG. 8 to generate the adjustment value 1310. The adjustment value 1310 is multiplied by the units conversion factor 1312 to convert the load current units to the duty cycle correction value 1314 for one of the digital switch control signals 1202 in FIG. 12. For example, an adjustment value 1310 of +10 microamperes may be converted to a duty cycle correction value 1314 of +4 microseconds.

Alternatively, the AFE may calculate the duty cycle of the digital switch control signals 1202 in an open loop by retrieving polynomial coefficients from a calibration database and calculating a value for the duty cycle of each of the digital switch control signals 1202 as a function of the desired load current. For example, a polynomial function of the load current for calculating the duty cycle of one of the digital switch control signals 1202 is given by the following equation:

$$DCi(I_L) = DC0i + DC1i \cdot I_L + DC2i \cdot I_L^2 + DC3i \cdot I_L^3 + \ldots \quad (6)$$

where DCi is the duty cycle of the digital switch control signal 1202 for the i-th fluorescent lamp 114, $I_L$ is the desired load current, and DC0i, DC1i, DC2i, DC3i, . . . are polynomial coefficients determined according to well-known techniques during calibration of the duty cycle of the digital switch control signals 1202 for each of the array of fluorescent lamps 114. The polynomial coefficients may be stored in the calibration database in the AFE.

In a further embodiment, the duty cycles of the digital switch control signals 1202 may be retrieved as pre-determined constants by the AFE from the calibration database.

Figure 14:
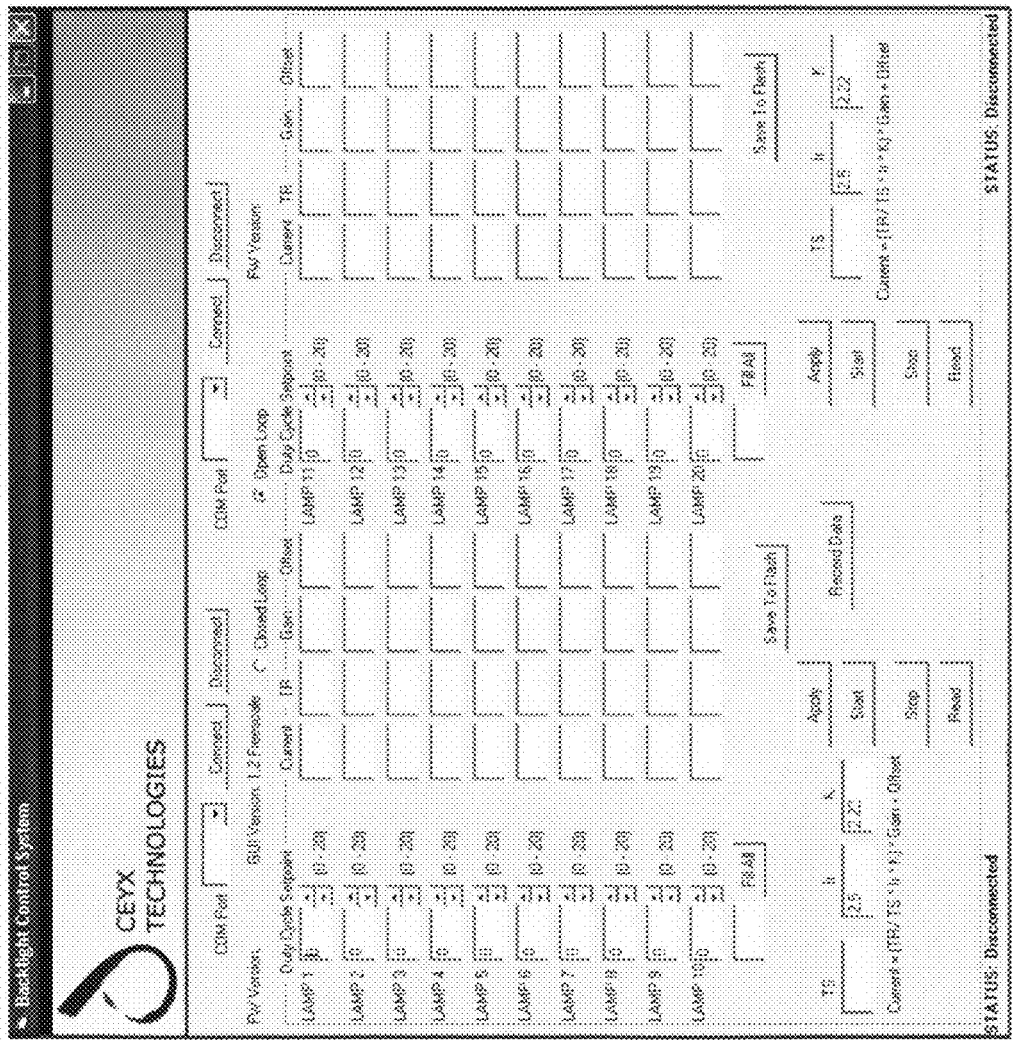
FIG. 14 illustrates a graphical user interface (GUI) for communicating parameters between the AFE of FIG. 9 and a PC.

FIG. 14 illustrates a graphical user interface (GUI) 1400 for communicating parameters between the AFE of FIG. 9 and a PC. The AFE can communicate over the RS-232 interface 808 with an external device, for example, a personal computer (PC), to receive and transmit parameters between the AFE and an application program to calibrate and test the array of fluorescent lamps 114. Examples of parameters that may be communicated between the IFE and an external device over the RS-232 interface 208 include the duty cycle of each of the digital switch control signals 1202, a servo mode signal, a reference current for calculating the load current, a conversion factor for calculating the load current, a set point value of the load current, a gain factor for calculating the load current, and an offset current for calculating the load current.

Although the flowcharts described above show specific steps performed in a specific order, these steps may be combined, sub-divided, or reordered within the scope of the appended claims. Unless specifically indicated, the order and grouping of steps is not a limitation of other embodiments that may lie within the scope of the claims.

The flow charts described above for the IFE and the AFE may be embodied in a disk, a CD-ROM, and other tangible computer readable media for loading and executing on a computer according to well-known computer programming techniques.

While the embodiments described above are generally intended for an array of fluorescent lamps, other embodiments may also be practiced within the scope of the appended claims for other electrical loads.

The specific embodiments and applications thereof described above are for illustrative purposes only and do not preclude modifications and variations that may be made within the scope of the following claims.

What is claimed is:

1. An apparatus, comprising:
   an inverter voltage microcontroller configured to generate a digital switch control signal having a duty cycle, wherein the duty cycle of the digital switch control signal is configured to control an inverter voltage output for an array of lamps; and
   a load current microcontroller configured to adjust the duty cycle of the digital switch control signal to regulate a load current through a lamp of the array of lamps, wherein the load current microcontroller is further configured to conditionally set a digital command signal to request a decrease in the inverter voltage output if the load current through the lamp is above a load current set point for the lamp and the duty cycle of the digital switch control signal is below a threshold.

2. The apparatus of claim 1, wherein the load current microcontroller is further configured to measure the load current through the lamp of the array of lamps to determine whether to adjust the duty cycle.

3. The apparatus of claim 2, wherein the load current microcontroller is configured to measure the load current through the lamp of the array of lamps by dual-slope integration.

4. An apparatus, comprising:
   an inverter voltage microcontroller configured to generate a digital switch control signal having a duty cycle, wherein the duty cycle of the digital switch control signal is configured to control an inverter voltage output for an array of lamps; and
   a load current microcontroller configured to adjust the duty cycle of the digital switch control signal to regulate a load current through a lamp of the array of lamps, wherein the load current microcontroller is further configured to conditionally set a digital command signal to request an increase in the inverter voltage output if the load current through the lamp is below a load current set point for the lamp and the duty cycle of the digital switch control signal is above a threshold.

5. An apparatus, comprising:
   an inverter voltage microcontroller configured to generate a digital switch control signal having a duty cycle, wherein the duty cycle of the digital switch control signal is configured to control an inverter voltage output for an array of lamps; and
   a load current microcontroller configured to adjust the duty cycle of the digital switch control signal to regulate a load current through a lamp of the array of lamps, wherein the load current microcontroller is further configured to conditionally set a digital command signal to maintain the inverter voltage output if the load current through the lamp is substantially equal to a load current set point for the lamp.

6. An apparatus, comprising:
   an inverter voltage microcontroller configured to generate a digital switch control signal having a duty cycle, wherein the duty cycle of the digital switch control signal is configured to control an inverter voltage output for an array of lamps; and
   a load current microcontroller configured to adjust the duty cycle of the digital switch control signal to regulate a load current through a lamp of the array of lamps, wherein the inverter voltage microcontroller is further configured to adjust the duty cycle of the digital switch control signal in response to a digital command signal from the load current microcontroller.

7. The apparatus of claim 6, wherein the inverter voltage microcontroller is configured to increment the duty cycle by a numerically-quantized increment based on the digital command signal from the load current microcontroller.

8. The apparatus of claim 6, wherein the inverter voltage microcontroller is configured to decrement the duty cycle by a numerically-quantized decrement.

9. An apparatus, comprising:
   an inverter voltage microcontroller configured to generate a digital switch control signal having a duty cycle, wherein the duty cycle of the digital switch control signal is configured to control an inverter voltage output for an array of lamps; and
   a load current microcontroller configured to adjust the duty cycle of the digital switch control signal to regulate a load current through a lamp of the array of lamps, wherein the load current microcontroller is further configured to set a digital command signal to indicate a load open-circuit condition in response to a determination that the load current through the lamp is below a load open-circuit threshold.

10. An apparatus, comprising:
an inverter voltage microcontroller configured to generate a digital switch control signal having a duty cycle, wherein the duty cycle of the digital switch control signal is configured to control an inverter voltage output for an array of lamps; and
a load current microcontroller configured to adjust the duty cycle of the digital switch control signal to regulate a load current through a lamp of the array of lamps, wherein the load current microcontroller is further configured to set a digital command signal to indicate a load short-circuit condition in response to a determination that the load current through the lamp is above a load short-circuit threshold.

11. A method comprising:
generating a digital switch control signal having a duty cycle configured to control an inverter voltage output for an array of lamps;
adjusting the duty cycle of the digital switch control signal to regulate a load current through a lamp of the array of lamps;
determining that the load current through the lamp is above a load current set point for the lamp and the duty cycle of the digital switch control signal is below a threshold; and
decreasing the inverter voltage output based on said determining that the load current through the lamp is above the load current set point for the lamp and the duty cycle of the digital switch control signal is below the threshold.

12. The method of claim 11, further comprising:
measuring the load current through the lamp of the array of lamps to determine whether to adjust the duty cycle.

13. The method of claim 12, wherein said measuring the load current through the lamp comprises measuring the load current through the lamp of the array of lamps by dual-slope integration.

14. A method comprising:
generating a digital switch control signal having a duty cycle configured to control an inverter voltage output for an array of lamps;
adjusting the duty cycle of the digital switch control signal to regulate a load current through a lamp of the array of lamps;
determining the load current through the lamp is below a load current set point for the lamp and the duty cycle of the digital switch control signal is above a threshold; and
increasing the inverter voltage output based on said determining the load current through the lamp is below the load current set point for the lamp and the duty cycle of the digital switch control signal is above the threshold.

15. A method comprising:
generating a digital switch control signal having a duty cycle configured to control an inverter voltage output for an array of lamps;
adjusting the duty cycle of the digital switch control signal to regulate a load current through a lamp of the array of lamps;
determining that the load current through the lamp is substantially equal to a load current set point for the lamp; and
maintaining the inverter voltage output based on said determining that the load current through the lamp is substantially equal to the load current set point for the lamp.

16. A method comprising:
generating a digital switch control signal having a duty cycle configured to control an inverter voltage output for an array of lamps;
adjusting the duty cycle of the digital switch control signal to regulate a load current through a lamp of the array of lamps; and
incrementing the duty cycle by a numerically-quantized increment or decrementing the duty cycle by a numerically-quantized decrement based on a digital command signal from a load current controller.

17. A method comprising:
generating a digital switch control signal having a duty cycle configured to control an inverter voltage output for an array of lamps;
adjusting the duty cycle of the digital switch control signal to regulate a load current through a lamp of the array of lamps; and
indicating a load open-circuit condition in response to a determination that the load current through the lamp is below a load open-circuit threshold, or
indicating a load short-circuit condition in response to a determination that the load current through the lamp is above a load short-circuit threshold.

18. An article of manufacture including a computer-readable medium having instructions stored thereon that, upon execution by a computing device, cause the computing device to perform operations comprising:
generating a digital switch control signal having a duty cycle configured to control an inverter voltage output for an array of lamps;
adjusting the duty cycle of the digital switch control signal to regulate a load current through a lamp of the array of lamps;
determining that the load current through the lamp is above a load current set point for the lamp and the duty cycle of the digital switch control signal is below a threshold; and
decreasing the inverter voltage output based on said determining that the load current through the lamp is above the load current set point for the lamp and the duty cycle of the digital switch control signal is below the threshold.

19. The article of manufacture of claim 18, wherein the operations further comprise:
measuring the load current through the lamp of the array of lamps to determine whether to adjust the duty cycle.

20. The article of manufacture of claim 19, wherein said measuring the load current through the lamp comprises measuring the load current through the lamp of the array of lamps by dual-slope integration.

21. An article of manufacture including a computer-readable medium having instructions stored thereon that, upon execution by a computing device, cause the computing device to perform operations comprising:
generating a digital switch control signal having a duty cycle configured to control an inverter voltage output for an array of lamps;
adjusting the duty cycle of the digital switch control signal to regulate a load current through a lamp of the array of lamps;
determining the load current through the lamp is below a load current set point for the lamp and the duty cycle of the digital switch control signal is above a threshold; and
increasing the inverter voltage output based on said determining the load current through the lamp is below the load current set point for the lamp and the duty cycle of the digital switch control signal is above the threshold.

22. An article of manufacture including a computer-readable medium having instructions stored thereon that, upon execution by a computing device, cause the computing device to perform operations comprising:
  generating a digital switch control signal having a duty cycle configured to control an inverter voltage output for an array of lamps;
  adjusting the duty cycle of the digital switch control signal to regulate a load current through a lamp of the array of lamps;
  determining that the load current through the lamp is substantially equal to a load current set point for the lamp; and
  maintaining the inverter voltage output based on said determining that the load current through the lamp is substantially equal to the load current set point for the lamp.

* * * * *